United States Patent [19]

Smyth

[11] Patent Number: 4,609,515
[45] Date of Patent: Sep. 2, 1986

[54] METHOD OF MAKING PLASTIC FILLED WIRE ROPE

[75] Inventor: Laurence C. Smyth, Beaconsfield, Canada

[73] Assignee: Wire Rope Industries Ltd., Pointe Claire, Canada

[21] Appl. No.: 687,966

[22] Filed: Dec. 31, 1984

[30] Foreign Application Priority Data

Apr. 24, 1984 [CA] Canada .................................. 452557

[51] Int. Cl.⁴ ............................................ B29C 47/02
[52] U.S. Cl. .................................... 264/174; 264/103; 264/136
[58] Field of Search ........ 264/174, 103, 136, DIG. 65; 425/112, 113, 215

[56] References Cited

U.S. PATENT DOCUMENTS

| | | | |
|---|---|---|---|
| 3,290,995 | 12/1966 | Pull | 264/162 |
| 3,334,166 | 8/1967 | Marzocchi | 264/136 |
| 3,787,352 | 1/1974 | Marzocchi et al. | 264/136 |
| 4,089,923 | 5/1978 | Theodossi et al. | 264/163 |
| 4,528,155 | 7/1985 | Elder | 264/174 |

FOREIGN PATENT DOCUMENTS 582779 9/1959 Canada .
716845 8/1965 Canada .
1007526 3/1977 Canada .

Primary Examiner—Donald Czaja
Assistant Examiner—Mary Lynn Fertig
Attorney, Agent, or Firm—Schwartz, Jeffery, Schwaab, Mack, Blumenthal & Evans

[57] ABSTRACT

A method is provided for making a plastic-filled wire rope by preheating a lubricated wire rope to a temperature close to the melting point of the plastic material with which the rope is to be filled, and then injecting the plastic material in molten state under heat and pressure into the wire rope so as to fill essentially completely the interstices between the strands and the individual wires, while displacing and removing most of the lubricant initially present within the rope. The obtained novel plastic-filled, lubricated wire rope has improved wear and fatigue resistance as well as increased life.

6 Claims, 3 Drawing Figures

METHOD OF MAKING PLASTIC FILLED WIRE ROPE

BACKGROUND OF THE INVENTION

1. Field of the Invention

This invention relates to a novel, plastic-filled, lubricated wire rope and to a method of its manufacture.

2. Related Art

Many attempts have been made to impregnate wire rope with plastic materials in order to decrease wear and fatigue of the rope and increase its life. For example, Canadian Pat. No. 582,779 issued Sept. 8, 1959 to Robert E. Campbell describes a vacuum impregnation of wire ropes with an elastomeric plastic material which is subsequently caused to undergo setting or gelation within the rope. Also, Canadian Pat. No. 716,845 issued Aug. 31, 1965 to Alfred Dietz describes a standard wire rope wherein synthetic plastic material is worked into the natural gaps in such a manner that it engages laterally in the gaps between the wires of the outer strands.

Furthermore, Canadian Pat. No. 1,007,526 issued Mar. 29, 1977 to Peter P. Riggs, describes a method of impregnating lubricated wire rope with a thermoplastic material wherein the rope is first formed while coating the strands with a heavy viscous lubricant, then the lubricated rope is preheated to a temperature in the range of about 38° C. to 134° C., then the outer strands of the wire rope are held spaced apart from one another and while the strands are so spaced, the rope is impregnated with a plastic composition so as to entrap the lubricant in the core and the strands.

All the above methods, and the resulting ropes, have certain inherent disadvantages which render them unsatisfactory. The Campbell patent requires working under a vacuum with ropes which must first be degreased and carefully prepared. The Dietz patent will not achieve a very good anchoring of the plastic rope because the plastic does not penetrate into the strands themselves. Such rope would, therefore, not be suitable for severe working environments for use, e.g. as a shovel rope which is subjected to a lot of bending and abuse.

Finally, the Riggs patent requires a special arrangement to hold the outer strands of the wire rope spaced from one another while the plastic material is incorporated. Also, since the lubricant is entrapped, the plastic material cannot fully penetrate the rope and strands and is much more likely to peel off in bending under heavy use. However, the retention of the lubricant within the rope is not the easiest of tasks to perform since the plastic material will sometimes tear or crack, thus enabling the lubricant to escape, thereby weakening the rope in that place.

SUMMARY OF THE INVENTION

It is, therefore, the object of the present invention to provide a simple and efficient method for filling lubricated wire ropes with plastic material, that would obviate the above disadvantages.

Another object is to provide a novel plastic-filled wire rope with improved wear and fatigue resistance and increased life.

The method for making plastic-filled wire rope in accordance with the present invention comprises preheating a lubricated wire rope to a temperature close to the melting point of the plastic material with which the rope is to be filled and then injecting the plastic material in molten state under heat and pressure into the wire rope so as to fill essentially completely the interstices between the strands and the individual wires while displacing and removing most of the lubricant initially present within the rope (retaining only a film or coating of said lubricant around individual wires). Then, any excess plastic material can be removed from the surface of the rope while it is still in molten state, before allowing said material to solidify.

For the purposes of the present invention, a standard lubricated wire rope can be used, which is normally lubricated with petrolatum or asphalt base lubricants. It should be noted, however, that rope preheating places some constraints on the lubricant which must not oxidize or otherwise significantly deteriorate at the required preheat temperature. Also, volatility is important and the lubricant must not be allowed to volatilize and blister the plastic material. In this regard, it has been found that standard petrolatum and asphalt base lubricants are quite suitable and no blistering takes place at working temperatures of up to about 200° C., which are most common, and these lubricants are not significantly deteriorated at such temperatures. However, synthetic lubricants can offer even better lubrication and less restriction with regard to filling materials because of their excellent high temperature stability and lower viscosity index (change in viscosity with temperature). There are many such lubricants presently on the market; however, they are usually more expensive than the conventional petrolatum and asphalt base lubricants. Examples of synthetic lubricants are: silicones, diesters, phosphate esters, polyglycols, fluorocarbons and polyphenyl ethers.

The plastic materials suitable for the purposes of the present invention are any materials that can be applied in molten or liquid form and injected into the wire rope. Examples of such materials are: polypropylene, high density polyethylene, nylon, etc; materials such as polyethylene can be cross-linked after their injection into the wire rope, if required.

For example, in the case of polypropylene which melts at 160°–168° C., the wire rope in accordance with this invention is preheated to about 140°–170° C. This preheating of the wire rope to a temperature close to the melting point of the plastic material is an important feature of the invention since it prevents freezing of the molten plastic on the wire rope which would block off the interior of the rope, core and strands from plastic penetration.

The injection of the molten plastic material into the wire rope can, e.g. be readily carried out by a conventional extrusion process. Thus, the molten plastic is supplied by an extruder to an extrusion cross-head and flows into the rope and usually takes the easiest path to the atmosphere. It is important to control the land length of the dies with respect to the rope diameter so that essentially complete filling of the wire rope can take place. Thus, if the land length of the dies is too short, all the plastic flows through the interstices between the strands, no back pressure is developed and no plastic enters the rope. Conversely, if the land lengths are too long, an equilibrium condition will develop wherein all non-solid spaces in the rope will be filled if sufficient pressure is applied. In practice, the die land lengths need not be excessively long, nor the pressure excessively high; for example, with polypropylene at 10–20 MPa cross-head pressure, a land length to diameter ratio of 5 is sufficient to develop essentially complete filling required for the purposes of this invention. The polypropylene would be extruded at a temperature of about 200° C. (190° C.–210° C.) which is somewhat higher than the melting point of the material but which is not sufficient to volatilize or excessively deteriorate the lubricant such as petrolatum or asphalt base lubricants. As the plastic material is extruded into the rope, it pushes out the vast majority of the rope lubricant, leaving only a film or coating thereof on the rope wires, which is quite sufficient to provide satisfactory lubrication for the plastic filled rope.

The rope remains substantially unaltered throughout the preheating and injecting process such that the outer strands of the wire rope will not be spread apart from one another during insertion of the plastic filler material but remain naturally spaced.

When the filled wire rope leaves the front extrusion die, the plastic tends to bulge out between the strands and this excess of plastic material should normally be removed to obtain a wire rope with a generally smooth outer periphery, having essentially the diameter that the original wire rope had prior to filling. Thus, it is not intended that the plastic would extend to any great degree beyond the outermost wires of the rope. The bulging of the plastic can be minimized by increasing the front die land length to diameter ratio. A more practical approach is to allow the bulging to occur during rope filling and to remove the excess plastic by providing a third die which has atmospheric pressure on either side; thus, there is effectively no pressure tending to create the bulging out of the plastic and the excess plastic is readily removed by this third die. The excess plastic can often be captured, cooled, granulated and blended back with virgin material for re-extrusion.

After removal of the excess plastic, the rope is cooled to solidify the plastic material and such cooling can be carried out by any desired means, such as, e.g. water cooling.

The resulting filled and lubricated wire rope has plastic material filling essentially completely the interstices between the strands and the individual wires, which remain coated only with a film of a suitable lubricant. The wire rope should normally have a smooth outer periphery and the plastic material should not extend substantially beyond the outermost wires thereof.

The invention will now be described with reference to the appended drawings in which:

DETAILED DESCRIPTION OF THE INVENTION

Figure 1:
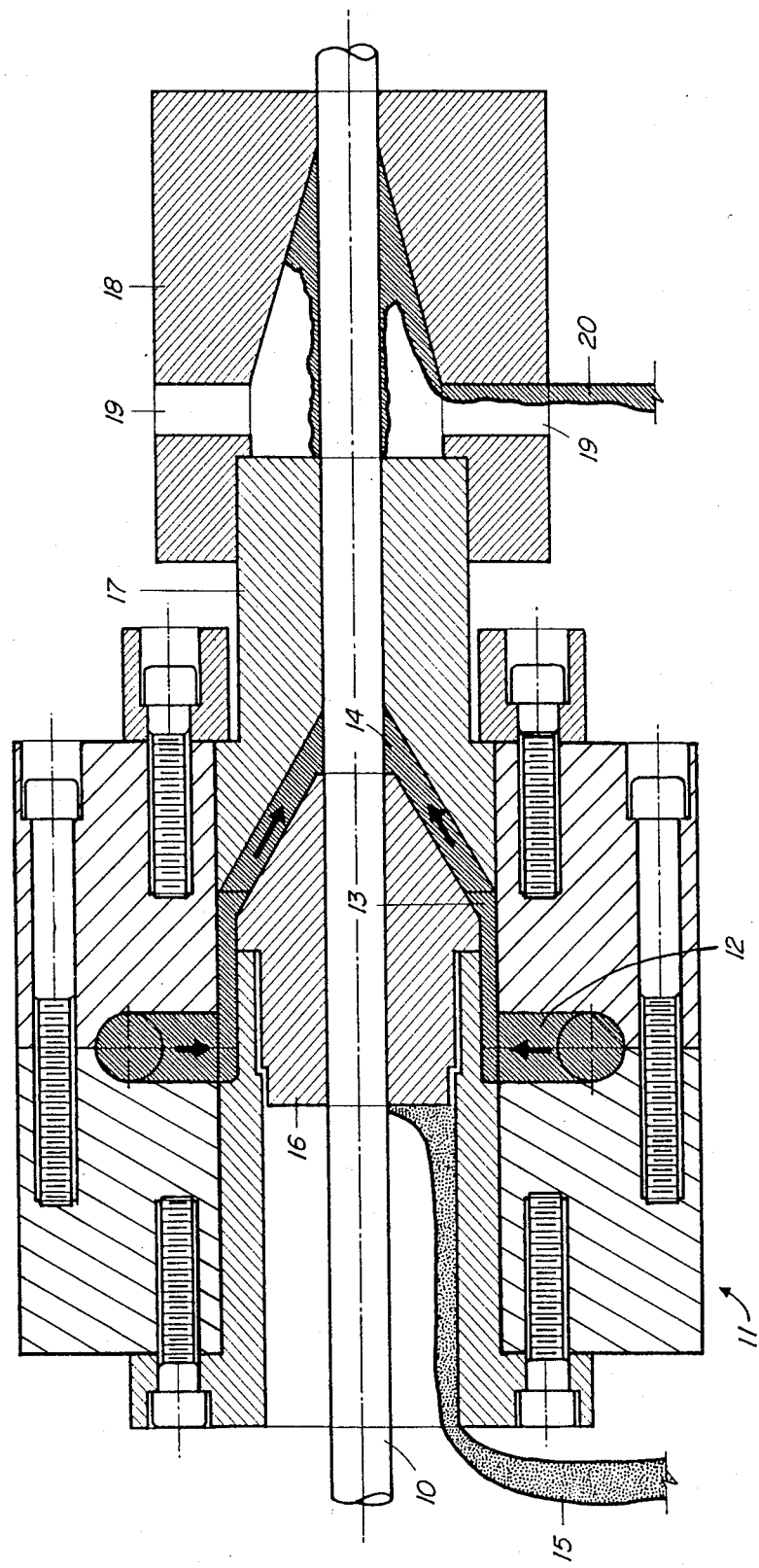
FIG. 1 is a longitudinal, generally cross-sectional view of the extruder arrangement for carrying out the method of the present invention in its preferred embodiment.

Referring to FIG. 1, the preheated wire rope 10 passes through extrusion cross-head 11. The preheating operation, although important, has not been illustrated because it can be carried out by any desired means, such as an induction heater, a flame heater or the like.

Molten plastic is typically supplied by an extruder through passages 12, 13 and 14, as shown by the arrows. The plastic is supplied under pressure which is generated by an extrusion screw (not shown). The pressurized plastic penetrates the rope 10 between dies 16 and 17 and the rearward flow of plastic through the rope pushes out the excess lubricant 15 at the rear of die 16 and out of the cross-head 11. Bulging of the plastic between the strands occurs as the filled rope exits die 17. The third die 18 is connected by holes 19 to the atmosphere and, therefore, operates at atmospheric pressure, serving to remove excess plastic material 20 from the surface of the filled wire rope. After leaving the cross-head, the filled wire rope is cooled to solidify the plastic material and then wound on a reel or the like for shipping to the market. Cooling can be carried out by any desired means, i.e. the rope can be cooled by air or water or the like.

Figure 3:
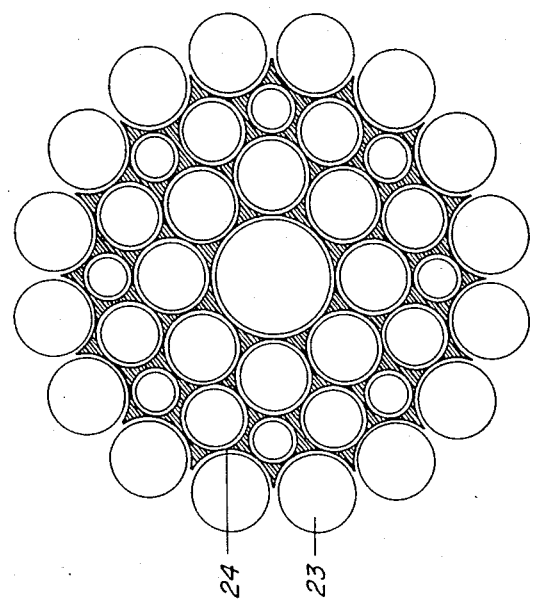
FIG. 3 is an enlarged cross-sectional view of one of the outer strands of the plastic filled wire rope, in accordance with the present invention.
Figure 2:
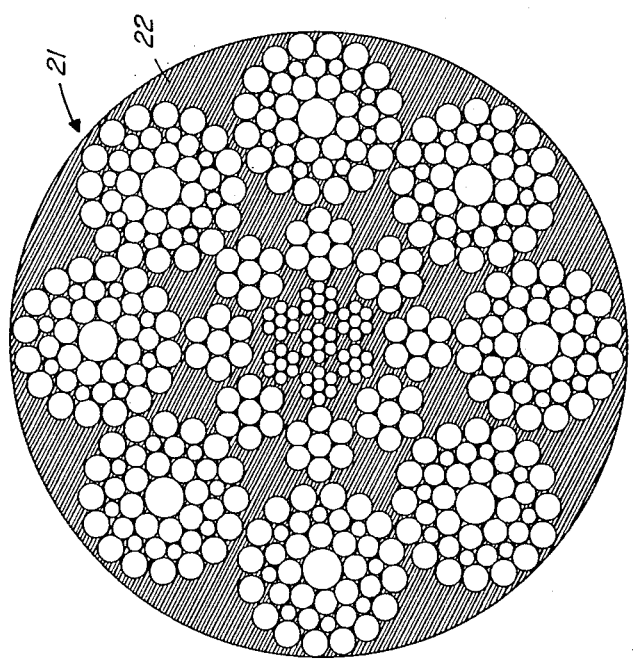
FIG. 2 is a cross-sectional view of an 8 strand wire rope, plastic filled in accordance with the present invention.

FIG. 2 shows the structure of a filled wire rope in accordance with the present invention having 8 outer strands over 8 inner strands over a 6 strand IWRC (Independent Wire Rope Core). This wire rope 21 is essentially fully filled with plastic material 22 in the interstices between all the strands as well as in the interstices between the individual wires within the various strands. FIG. 3 shows the structure of one outer strand of such filled wire rope in an enlarged view. It is shown here that the plastic material 22 has penetrated the interstices between individual wires 23, leaving only a lubricating film 24 around such wires. Essentially the same condition prevails in all the strands of the wire rope as well as in the IWRC.

The wire rope shown in FIG. 2 is an 8 strand rope; however, it should be pointed out that the invention is not limited to such a rope and other rope constructions can be readily filled with plastic material in accordance with this invention. In fact, 6 strand ropes, which are more common in the wire rope business, can be so filled with even greater ease.

In order to demonstrate the advantages of this invention, the following example is provided.

EXAMPLE

An 8 strand rope of 1 ¾ in. diameter having a construction as shown in FIG. 2, lubricated with an asphaltic base lubricant was subjected to bend-oversheave test having the following conditions:
Sheave diameter: 43 in track dia., nominally 25:1 bending ratio.
Test load: 86,700 lb., nominally ⅓ of breaking load.
Cycle rate: 720 cycles/hour
Cycle stroke: 12 ft.
The number of bending cycles until strand failure was recorded at 63,000.

The same rope but filled with polypropylene in accordance with the present invention gave the number of bending cycles until strand failure at 186,000.

This means that, in effect, the rope made in accordance with the present invention was about three times more resistant than the unfilled, lubricated rope of the same construction. It should, of course, be understood that not all ropes will achieve a similar improvement because it will depend on many factors, such as the plastic material used, the processing conditions, the type of the rope employed, etc. However, it is obvious that a substantial advantage will always be obtained when the teachings of this invention are properly applied. Also, the invention should not be limited to the specific embodiments described and illustrated herein, and various modifications obvious to those skilled in the art can be made without departing from the spirit of the invention and the scope of the following claims.

I claim:

1. Method of making plastic filled wire rope comprising the steps of:
   (a) preheating a lubricated wire rope to a temperature close to the melting point of a plastic material with which the rope is to be filled thereby preventing freezing of the molten plastic on the wire rope and preventing blockage of plastic flow into the rope interior, core, and strands; and
   (b) injecting the plastic material in a molten state into the preheated wire rope under sufficient heat and pressure to essentially completely fill all interstices disposed between strands of the rope and between individual wires within the strands and the core, while displacing and removing most of the lubricant initially present within the rope wherein said rope remains substantially unaltered throughout the preheating and injecting steps.

2. Method according to claim 1, wherein the step of injecting the plastic material is carried out by extrusion at a temperature above the melting point of the plastic material but insufficient to volatilize and significantly deteriorate the lubricant.

3. Method according to claim 2, wherein the extrusion is carried out at a pressure just sufficient to substantially completely fill the wire rope with the plastic material, leaving only a film of the lubricant around individual wires.

4. Method according to claim 1, wherein the plastic material comprises polypropylene and the wire rope is preheated to a temperature of between about 140°–170° C. and then said polypropylene is extruded into the wire rope at a temperature of about 190°–210° C. and a pressure of about 10–20 MPa.

5. Method according to claim 1, further comprising the step of removing excess plastic material from the surface of the filled rope while still in a molten state by providing a die at an exit of the extrusion process through which the filled rope is passed under atmospheric conditions.

6. Method according to claim 1, wherein the plastic material within the wire rope is solidified by cooling the rope with water.

* * * * *